Nov. 17, 1953     M. MORRISON     2,659,853
ELECTRIC IMPULSE MOTOR DEVICE
Filed Aug. 16, 1949     2 Sheets-Sheet 1
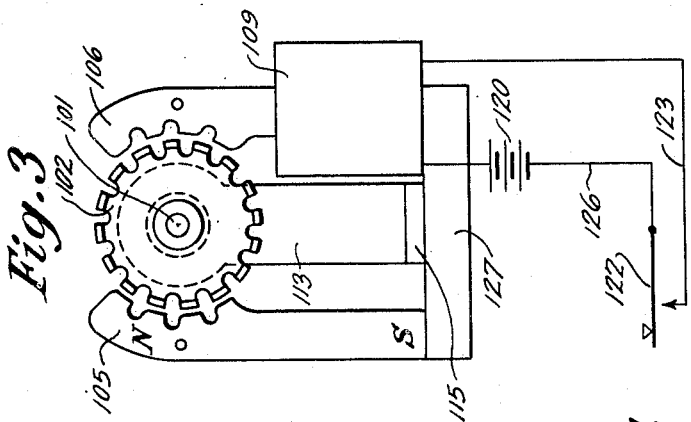
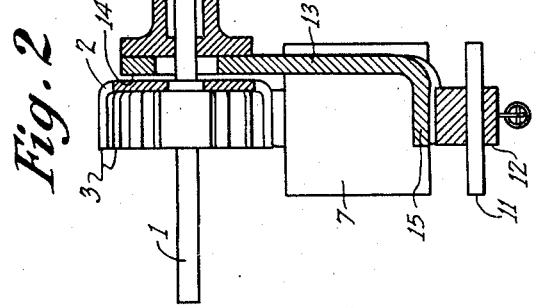
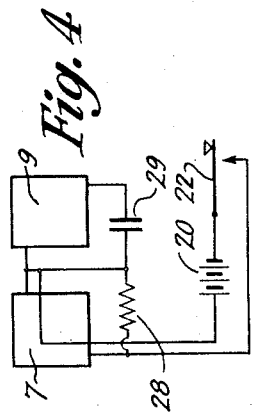
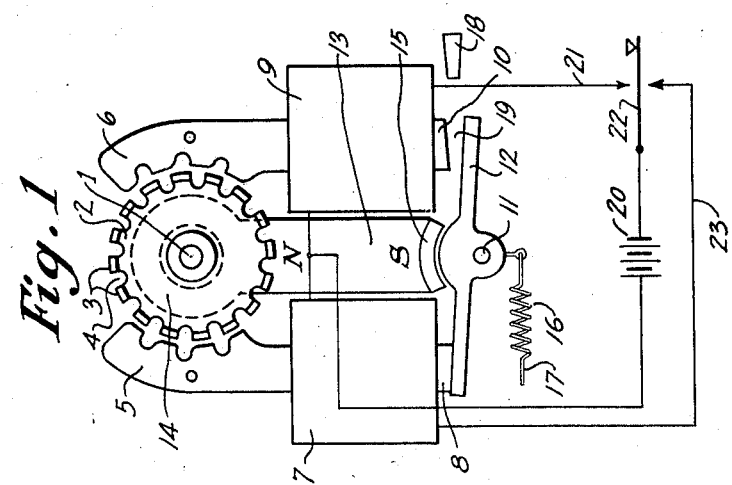
INVENTOR
Montford Morrison Nov. 17, 1953 — M. MORRISON — 2,659,853
ELECTRIC IMPULSE MOTOR DEVICE
Filed Aug. 16, 1949 — 2 Sheets-Sheet 2
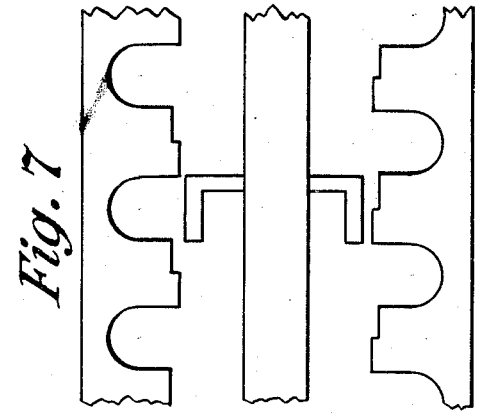
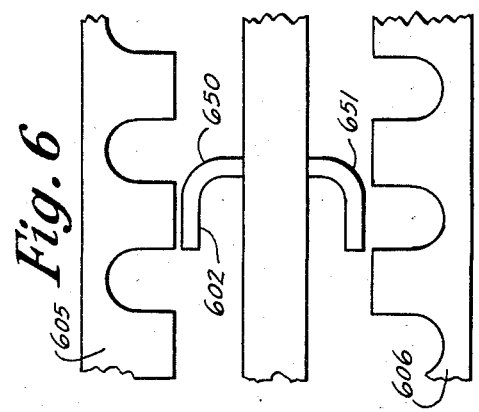
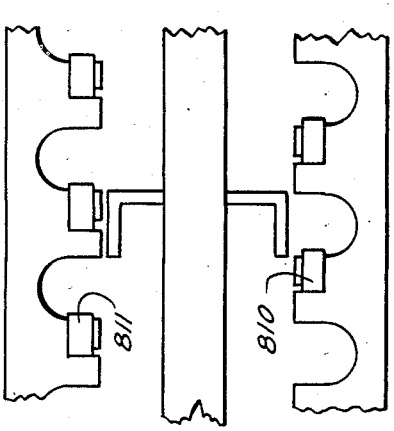
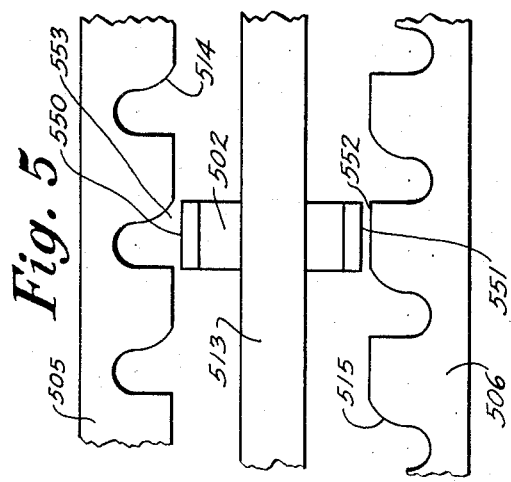
INVENTOR
Montford Morrison Patented Nov. 17, 1953

2,659,853

UNITED STATES PATENT OFFICE 2,659,853

ELECTRIC IMPULSE MOTOR DEVICE

Montford Morrison, Upper Montclair, N. J.

Application August 16, 1949, Serial No. 110,596

3 Claims. (Cl. 318—491)

The present invention relates generally to electric current impulse motors, it relates more particularly to impulse stepping devices, and it relates more specifically to impulse counters.

Among the objects of the invention is to provide a rotating armature, which turns exactly a predetermined number of angular degrees for each impulse of current fed through the motor.

A further object of the invention is to provide a transducer of electric current impulses into definite measured rotary motion without the use of intermediary mechanical devices.

A further object of the invention is to provide a stepping switch operating mechanism which has no mechanical stepping mechanism in it.

A further object of the invention is to provide an electrical impulse counter operating mechanism which has no ratchets nor latches in it.

Further and other objects will be pointed out and obvious to those skilled in the art through the course of the specification.

The generic nature of the invention resides importantly in an electric motor structure comprising a salient pole stator and a salient pole rotor having pole structure providing lesser magnetic operating flux reluctance for rotor operating in one direction than in the other, under direct current impulse operation.

A further nature of the invention resides in a dual magnetic path for the flux in the rotor which is caused to alternate in effective direction thereby causing rotor operation in a predetermined direction for a series of direct current impulses.

A further nature of the invention resides in having a constant rotor position holding flux which causes the rotor to be held in any position to which it has been rotated.

A further nature of the invention resides in forming the cooperating poles of the stator and rotor to cause the rotor to move in one direction and in one direction only.

A further nature of the invention resides in having a constant magnetic field which in cooperation with the structural elements of the invention, causes the rotor to move through a definite predetermined angular displacement for each impulse received by the stator winding.

Referring to the drawing, Fig. 1 is an embodiment of the invention, with some of the shaft bearings removed for clearness, Fig. 2 is a section of Fig. 1, taken through the vertical center line thereof, Fig. 3 is a second embodiment of the invention, Fig. 4 is connection diagram, which when applied to Fig. 1 constitutes a third embodiment of the invention, and Figs. 5, 6, 7 and 8 are drawings useful in teaching the art of pole structure employed in the invention.

Referring to Figs. 1 and 2, 1 is a shaft carrying a rotor 2 having a multiplicity of salient poles such as 3, with interpolar spaces such as 4, the structural forms of these poles and spaces will be disclosed in connection with Figs. 5–8 inclusive.

Fig. 1, 5 is a stator member having poles equi-angularly spaced with the poles of the rotor, and 6 is a stator member having poles equi-angularly spaced with the poles of the rotor. Stator members 5 and 6 are so related angularly that when the poles of 5 register with the poles of the rotor 2, the poles of 6 register with the inter-polar spaces of rotor 2, as shown in the figure, and obviously when the poles of 6 register with the poles of the rotor, the poles of 5 register with the inter-polar spaces of the rotor.

Stator member 5 forms the core of magnet coil 7, and which protrudes through said coil forming a magnetic pole 8. Likewise stator member 6 forms the core of magnet coil 9, and protrudes through said coil forming a magnetic pole 10.

Figs. 1 and 2, 11 is a shaft which may be supported in suitable bearings which are omitted in the figure for clearness; 12 is an armature for magnetic poles 8 and 10; 13 is a magnetic circuit member processed into a permanent magnet, having a surface 14 spaced closely to rotor 2 to direct the flux of magnet 13 through rotor 2, and then through stator and rotor poles to stator members 5 and 6, and thence to magnetic poles 8 and 10. Permanent magnet 13 has one end 15, closely spaced to armature 12, so that the magnetic circuit of permanent magnet 13 may be completed through armature 12, to magnetic poles 8 or 10.

Spring 16 may be employed under tension or under compression by suitably fixing end 17 thereof, and may be employed to hold armature 12, either against pole 8, or against pole 10, if and when desired.

Wedge 18 may be inserted into space 19, eliminating possible rotation of armature 12, and in such a case Fig. 1 becomes, in effect, a simple motor with a rotor, which operates under electrical impulses without the aid of a rocking armature.

Battery 20 supplies current to coil 9 through lead 21, when key 22 is lifted to contact position, and supplies current to coil 7 through lead 23, when pressed to contact position.

Fig. 2, shaft 1 may be provided with a thrust bearing 24, and an adjustment 25, to conveniently fix the length of the air-gap formed between the surface 14 and rotor 2.

Fig. 3 is an embodiment having a shaft 101, a rotor 102, stator members 105 and 106, and a single coil 109 similar to the corresponding unitary numbered members of Fig. 1. In Fig. 3, stator member 105 is processed into a permanent magnet and member 113 is not permanently magnetized, but merely forms a return magnetic path for magnetic flux in stator member 105, and for magnetic flux in stator member 106 when current flows in coil 109, from battery 120, through leads 123 and 126, when key 122 is pressed to contact.

The magnetic circuit of Fig. 3 is completed through bar 127, which magnetically bridges the lower ends of stator members 105 and 106, as well as does it serve to bridge said stator members with central magnetic circuit member 113 at its lower end 115.

The magnetic flux in permanent magnetic stator member 105, flows mainly through bar 127, thence through member 113, thence to rotor 102, and therefrom to member 105. The magnetic flux caused in member 106 by current in coil 109, flows through bar 127, thence through 127, thence through member 113, thence to rotor 102, and therefrom to member 106.

Before a detailed operation of Figs. 1, 2 and 3 can be traversed, a teaching of the structure of the poles employed in the stators and rotors of the figures must be set forth.

It must be understood by those skilled in the art who undertake to embody this invention in practical devices, that when motor devices are made in sizes usually employed in the stepping switches, impulse counter and particularly in sizes useful in automobile clocks, that the fields of magnetic flux is sometimes greatly modified by the effect of what is termed "stray" or "leakage" flux, and the relative shapes and sizes of pole faces to cause a desired flux distribution in one size of device may not give the same distribution if made on a different scale.

Therefore in a patent specification only general directions for forming poles can be given, and for precise performance, empirical determination following the general directions must be followed. The general teaching of the structure of the poles is given below.

In Figs. 5, 6, 7 and 8, the poles of the stators are laid out in a straight line instead of a circular line as is common practice in texts relating to the subject. For simplicity only two poles of rotor are shown, and the magnetic circuit return path is shown as a strip. The figures show only fragmentary parts of the stators, so that the pole faces can be enlarged to a size that is clearly suited to teaching the structure.

Referring to Fig. 5, 505 and 506 are fragmentary parts of the stator members of Figs. 1, 2, and 3, and 502 is a member which represents the rotor of the previous figures, but is considered to move linearly in an easterly direction, it has two pole faces 550 and 551. When one of these pole faces such as 551, registers with a stator pole face such as 552, the other pole face 550, registers with an inter-polar space such as 553. The return circuit member 513 is considered stationary and in close relation with 502.

In shaping the faces of the poles of the stator or in shaping the faces of the poles of the rotor individually or jointly the form to make is one which produces an unbalanced pull in one direction or the other by having the magnetic reluctance to movement of the rotor in one direction less than the magnetic reluctance to movement in the other direction.

Referring to Fig. 5, one side of the pole faces of 505 and 506 are rounded as shown at surfaces 514 and 515. This rounding of one side of the pole faces causes an unsymmetrical magnetic pull on the rotor member 502; and under a normal magnetic field created in 505, pulls member 502 to the east; though stray, shunted or leakage flux in the magnetic circuit can cause member 502, to be pulled to the west. However if the pole faces have sufficient directively unsymmetrical magnetic reluctance the rotor will move in one direction and in that direction only.

Fig. 6 shows how directively unsymmetrical magnetic reluctance is obtained by forming the faces 650 and 651, of the rotor 602. The poles of the stator members 605 and 606, may be symmetrical as shown or modified if desired in accordance with the teachings above.

Fig. 7 shows a further form of unsymmetrical pole faces, which may be employed as illustrated or in combination with the other pole face teachings given herein.

Fig. 8 shows forms of pole faces which are structurally symmetrical on both the rotor and on the stator; the unsymmetrical magnetic reluctance being obtained by shading coils, 810 and 811, the operation of which is well understood in the art.

The detailed operation of Figs. 1, 2, and 3 will now be traversed with the understanding that any of the teachings set forth in connection with Figs. 5, 6, 7 and 8, may be applied to the structures shown in Figs. 1, 2, and 3. Different methods are suited to operating the structures disclosed in these figures and several will be traversed, others will be obvious to those skilled in the art.

Referring to Fig. 1, with rotor 2 and armature 12 in the positions shown, and spring end 17 loose, rotor 2 is held in the position shown, by flux from permanent magnet 13 flowing through armature 12, to magnetic pole 8, thence to the poles of stator member 5 which are in registration with the poles of rotor 2, through rotor 2 back to permanent magnet 13 through surface 14 (Fig. 2) thereof.

If key 22 is lifted to contact, the current through coil 10, closes the gap 19, by magnetic attraction of armature 12, and rotor 2 rotates until the poles of stator member 6 are in registration with the poles of rotor 2, and the constant field of permanent magnet 13 holds it in this position, after the current in coil 9 is discontinued on breaking the coil circuit by allowing key 22 to assume its neutral position, shown in the figure. If key 22 is now pressed to contact, rotor 2, and armature 12, return to the positions shown in the figure. The operations may be repeated indefinitely with the result that with each alternate contact of key 22, the rotor 2, moves an angular distance equal to ½ the pole pitch of the stator and the rotor is held in any degree of angular displacement to which it is revolved.

The movement of armature 12 is useful in driving electric clocks and the movement of the rotor is useful in indicating the time elapsed, if the electrical impulses fed to coils 7 and 9 are properly timed.

Obviously, the movement of the rotor is useful in counting the number of impulses that is received from any source, and the application of the invention is not a limitation thereof.

If "spring bias" is applied to armature 12, by means of tension or compression from spring 16, the operation of Fig. 1 can be accomplished by current impulses in one of coils 7 or 9 without employing current impulses in both. One example will suffice to teach this embodiment.

If sufficient tension is applied to spring 16, by pulling westwardly on end 17, armature 12 will assume the position shown in the figure in the absence of current in coil 9. If sufficient current is applied to coil 9, gap 19 will close as long as there is current in the coil, but sufficient spring tension will return to armature 12 to the position shown in the figure, in the absence of current in coil 9. The operation is thus; an impulse of current closes air-gap 19, and turns rotor 2½ pole-pitch, on breaking the current in coil 9, armature 12 is pulled back to its starting position, and in so doing the flux of permanent magnet 13, is caused to flow through stator member 5, which causes rotor 2 to turn an additional ½ pole-pitch forward to a position corresponding with that shown in the figure. That is, under this condition of operation, for each impulse in one coil, two spacing operations are performed by rotor 2, and it is always held in the second spaced position, in the absence of coil current.

An additional method of operating the motor structure of Fig. 1, is by eliminating spring 16, and employing circuit diagram Fig. 4, in which one of the coils 7, may be connected directly to battery 20, and the other of the coils 9 is connected simultaneously to battery 20, through a retarding circuit such as resistor 28 and capacitor 29. Momentary contact of key 22, causes this circuit to have a time difference between the maximum flux crests in the two circuits, causing two rotor spacings for each current impulse.

The operation of Fig. 1 with plug inserted in gap 19, is the same as with the plug out, except that there is no movement of armature 12, and magnetic circuit values are adjusted to give the same operation as with the plug out, which can be done empirically.

The operation of Fig. 3 is accomplished by the magnetized member 105 providing magnetic bias in one stator member, much the same way as spring 16 causes normally a magnetic bias in stator member 5 of Fig. 1. That is, the magnetism of stator member 105, holds rotor 102 in the position shown in Fig. 3, with sufficient current in coil 109, rotor 102 is turned ½ pole-pitch, and on breaking the current in coil 109, the magnetism of member 105 turns rotor 102 an additional ½ pole-pitch, so that for each current impulse in coil 109, two rotor spacings are obtained.

The expression "polar structural means causing directionally unsymmetrical rotor air-gap reluctance" is hereby defined to mean any embodiment of the teaching herein relating thereto and particularly the teaching in connection with Figs. 5–8 inclusive.

Also where the expression "permanent magnet" or a similar expression is used, electromagnets are a perfectly obvious equivalent thereof.

Several embodiments of the invention have been taught, but the nature of the invention is more clearly set forth in the claims hereunder.

What is claimed is:

1. In a motor device driven by direct current impulses, a rotor having salient poles, two stator members each having salient poles of an angular pitch equal to the pole-pitch of said rotor, one of said stator members having its poles rotated one-half pole-pitch from the angular periodic sequence of the poles of the other said member, all said poles formed to provide greater magnetic reluctance between the poles of the stator and the poles of the rotor for one direction of rotation thereof than for the other direction of rotation thereof, a third stator member located in between said two stator members dividing the magnetic fields of each of said two stator members through said rotor into two independently magnetizable stator magnetic circuits, two independent means for independently magnetizing said two magnetic circuits, one of said means being a source of constant magnetic flux included in a first of said two stator magnetic circuits, said flux attracting said rotor into a locked-rotor pole-position when extant, the other of said means being an electrically-excitable embracing-coil in a second of said two stator magnetic circuits and having a circuit including a switch with a source of direct current creating magnetic flux in said second magnetic circuit impelling said rotor out of said locked-rotor pole-position to an advanced half-pole-pitch locked-rotor position, the magnitude of said attracting flux being sufficient to hold said rotor in said locked position when said switch is open, the magnitude of said impelling flux being sufficient to pull said rotor out of said locked position to said advanced position when said switch is closed, and the magnitude of said attracting flux being also sufficient to attract said rotor to an additional advanced half-pole-pitch locked-rotor position when said switch is opened after closing.

2. In a motor device driven by direct current impulses, a rotor having salient poles, two stator members each having salient poles of an angular pitch equal to the pole-pitch of said rotor, one of said stator members having its poles rotated one-half pole-pitch from the angular periodic sequence of the poles of the other said member, all said poles formed to provide greater magnetic reluctance between the poles of the stator and the poles of the rotor for one direction of rotation thereof than for the other direction of rotation thereof, a third stator member located in between said two stator members dividing the magnetic fields of each of said two stator members through said rotor into two independently magnetizable stator magnetic circuits, two independent means for independently magnetizing said two magnetic circuits, one of said means being a permanent magnet source of constant magnetic flux included in a first of said two stator magnetic circuits, said flux attracting said rotor into a locked-rotor pole-position the other of said means being an electrically-excitable embracing-coil in a second of said two stator magnetic circuits and having a circuit including a switch with a source of direct current creating magnetic flux in said second magnetic circuit impelling said rotor out of said locked-rotor pole-position to an advanced half-pole-pitch locked-rotor position, the magnitude of said permanent magnetic flux being sufficient to hold said rotor in said locked position when said switch is open, the magnitude of said impelling flux being sufficient to pull said rotor out of said locked position to said advanced position when said switch is closed, and the magnitude of said permanent magnetic flux being also sufficient to attract said rotor to an additional advanced half-pole-pitch locked-rotor position when said switch is opened after closing.

3. In a motor device driven by direct current impulses, a rotor having salient poles, two stator members each having salient poles of an angular pitch equal to the pole-pitch of said rotor, one of said stator members having its poles rotated one-half pole-pitch from the angular periodic sequence of the poles of the other said member, all said poles formed to provide greater magnetic reluctance between the poles of the stator and the poles of the rotor for one direction of rotation thereof than for the other direction of rotation thereof, a third stator member located in between said two stator members dividing the magnetic fields of each of said two stator members through said rotor into two independently magnetizable stator magnetic circuits, two independent means for independently magnetizing said two magnetic circuits, one of said means being an electrical source of constant magnetic flux included in a first of said two stator magnetic circuits, said flux attracting said rotor into a locked-rotor pole position when extant, the other of said means being an electrically-excitable embracing-coil in a second of said two stator magnetic circuits and having a circuit including a switch with a source of direct current creating magnetic flux in said second magnetic circuit impelling said rotor out of said locked-rotor pole-position to an advanced half-pole-pitch locked-rotor position, the magnitude of said attracting flux being sufficient to hold said rotor in said locked position when said switch is open, the magnitude of said impelling flux being sufficient to pull said rotor out of said locked position to said advanced position when said switch is closed, and the magnitude of said attracting flux being also sufficient to attract said rotor to an additional advanced half-pole-pitch locked-rotor position when said switch is opened after closing.

MONTFORD MORRISON.

References Cited in the file of this patent

UNITED STATES PATENTS

| Number | Name | Date |
|---|---|---|
| 788,762 | Favarger | May 2, 1905 |
| 1,405,502 | Dodds | Feb. 7, 1922 |
| 1,603,646 | Sperry | Oct. 19, 1926 |
| 2,081,411 | Stroller et al. | May 25, 1937 |
| 2,249,029 | Mullerheim | July 15, 1941 |
| 2,321,699 | O'Brien | June 15, 1943 |
| 2,499,316 | Johnson | Feb. 28, 1950 |

FOREIGN PATENTS

| Number | Country | Date |
|---|---|---|
| 28,539 | Great Britain | of 1902 |
| 522,557 | Great Britain | June 20, 1940 |